Nov. 30, 1926.  1,608,568
F. C. SHEPLEY
HYDRAULIC BRAKE
Filed July 25, 1925   2 Sheets-Sheet 2
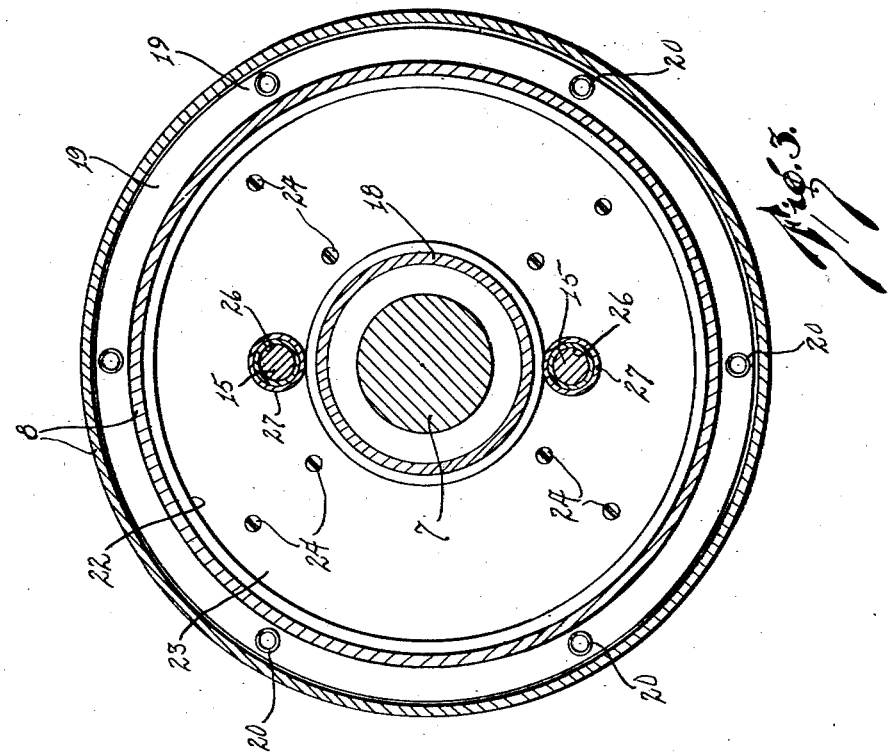
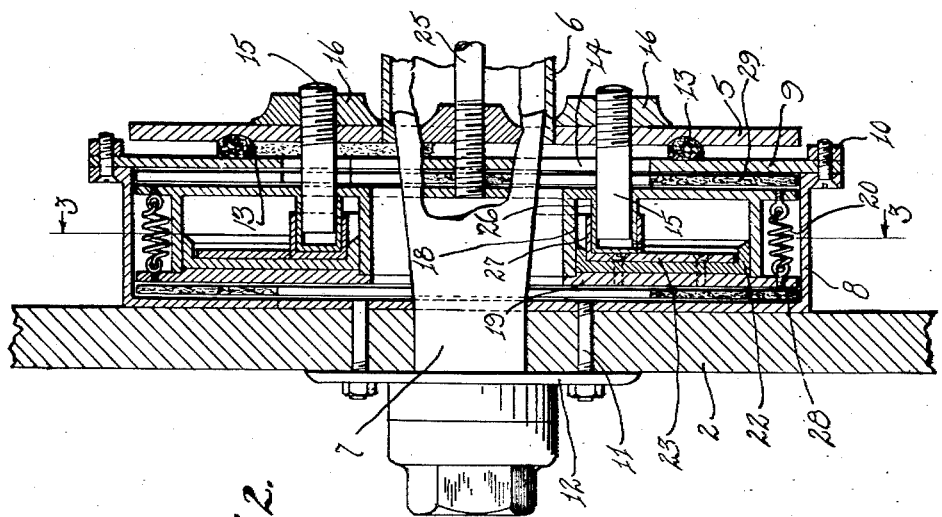
INVENTOR
F. C. SHEPLEY
BY
ATTORNEYS Patented Nov. 30, 1926.

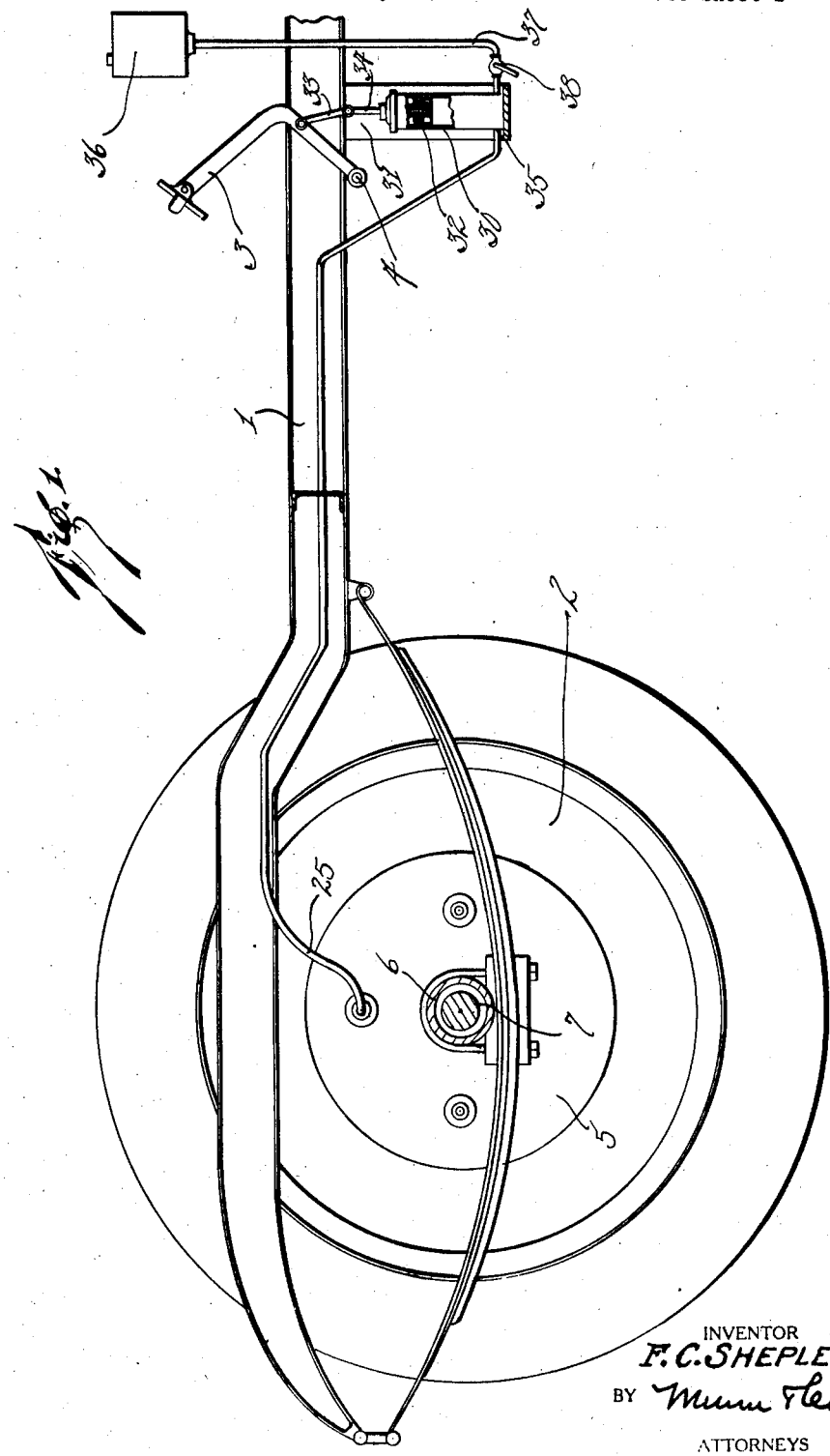

1,608,568

UNITED STATES PATENT OFFICE.

FRANK CRIST SHEPLEY, OF HOMINY, OKLAHOMA.

HYDRAULIC BRAKE.

Application filed July 25, 1925. Serial No. 46,146.

My invention relates to improvements in hydraulic brakes, and it consists in the combinations, constructions, and arrangements herein described and claimed.

An object of my invention is to provide a hydraulic brake of the character described which is primarily intended for use upon motor vehicles, and in which novel structure is employed for producing a maximum friction surface between the moving parts of the wheel structure with which the brake is employed.

A further object of my invention is to provide a hydraulic brake of the character described in which replacement of the brake linings is easily carried out.

A further object of my invention is to provide a hydraulic brake of the character described in which the expanding fluid chambers are exceptionally large with respect to the fluid feed pipes, whereby great pressure may be brought to bear upon the brake linings with little manual effort upon actuation of the foot pedal.

Other objects and advantages will appear in the following specification, and the novel features of the invention will be particularly pointed out in the appended claims.

My invention is illustrated in the accompanying drawings, forming part of this application, in which—

Figure 1 is a side elevation of an embodiment of my invention, a part thereof in section, Figure 2 is a partial sectional view of the mechanism shown in Figure 1, and Figure 3 is a sectional view along the line 3—3 of Figure 2.

In carrying out my invention I make use of the ordinary type of motor vehicle having a chassis frame 1, wheels such as the rear wheels, one of which is shown at 2, see Figure 1, and a brake foot pedal 3, which is pivotally mounted at 4 to the frame 1.

My improved hydraulic brake consists in a plate 5 which is fixed against rotation to the axle housing 6 of the axle 7 of the vehicle. A hollow chamber consisting of two parts 8 and 9 secured together by bolts 10 is secured by provision of bolts 11 to the hub 12 of the wheel 2 so that the chamber will turn with the wheel in that space between the plate 5 and the wheel.

An annular felt gasket 13 is fixed to the outer face of the plate 5 and is arranged to bear against the adjacent face of the part 9 of the chamber. The part 9 has a central opening 14 therethrough through which a pair of stud bolts 15 are projected within the chamber. These bolts 15 are secured to interiorly threaded bossed portions 16 formed on the outer wall of the plate 5.

An expansion chamber or cylinder, annular in sectional contour, see Figure 3, is disposed within the chamber formed of the parts 8 and 9 and consists in a pair of cooperating parts 18 and 19. These parts are normally drawn toward one another by the provision of a plurality of tension springs 20 which are secured at one end to the part 19 and at the opposite end to the part 18.

A resilient gasket 22 is secured by means of a plate 23 and screws 24 to the part 19, whereby movement of the parts 18 and 19 toward or away from one another may not break or affect the seal between the parts.

A tube 25 is provided which communicates with the interior of the expandible chamber formed of the parts 18 and 19 so that when oil under pressure is forced through the tube 25, the parts 18 and 19 will move away from one another and toward the adjacent walls of the parts 8 and 9 of the chamber secured to the wheel 2.

Means for preventing rotation of the expandible chamber is provided in overlapping sleeves 26 and 27 formed integrally with the parts 18 and 23 respectively. The stud bolts 15 are projected through the sleeves 26, there being two sleeves 26 and 27 for the two stud bolts 15.

Brake linings 28 and 29 are disposed between the adjacent walls of the parts 19—8 and 18—9 respectively. These brake linings are annular in contour, see Figure 2.

A hydraulic cylinder 30 is mounted upon a support 31 at the forward end of the chassis frame 1 and has a piston 32 therein which is connected by means of a connecting rod 33 and pitman 34 to the pedal 3 so that when the foot pedal 3 is forced downwardly, the piston 32 will be forced downwardly in the cylinder 30. The opposite end of the tube 25 communicates with the lower end of the cylinder 30 as shown at 35.

An oil reservoir 36 is disposed above the level of the tube 25 and communicates by means of the tube 37 through a normally closed valve 38 with the lower end of the cylinder 30.

From the foregoing description of the various parts of the device, the operation thereof may be readily understood. When it is desired to apply the brake, the driver will press downwardly upon the foot pedal 3 and oil in the cylinder, the tube 25, and in the expandible chamber will be placed under pressure so that the parts 18 and 19 will move against the force of the springs 20 and force the brake linings 28 and 29 into engagement with the walls of the parts 19—8 and 18—9 respectively, thereby causing resistance to the rotation of the wheel and having a braking effect so as to stop the rotation of the wheel.

The pressure with which the expandible chamber will bear against the friction linings is determinable by the force and extent with and to which the pedal 3 is forced downwardly.

The gasket 13 will effectively prevent spattering or movement of any slight quantities of oil which may leak between the parts 18 and 19 so as to confine such oil within the axle housing 6.

If it is desired to change the quantity of oil within the cylinder 30 so as to regulate the brake, it is merely necessary to open the valve 38 and permit oil to flow into the cylinder, or if less oil is desired in the system, then the valve 38 may be opened and the pedal 3 forced downwardly so as to cause oil to move up into the reservoir whereupon the valve 38 will be closed and the pedal released.

It should be noted while I have here shown my brake applied to one rear wheel of the vehicle that all four wheels may have similar brakes if desirable in which case the tube 25 will have four branches, one communicating with each expandible chamber.

I claim:

1. A hydraulic brake of the character described comprising a chamber having parallel side walls disposed at right angles to the axis of a vehicle wheel, a fluid-containing expandible chamber disposed within said first named chamber, and composed of two relatively movable annular members, one of said members having a portion telescopically disposed within the other member, means for supplying fluid to the interior of the chamber, a stationary pin, means carried by one of said movable annular members and surrounding said pin for permitting movement of said annular member longitudinally with respect to said pin, while preventing rotative movement with respect to the axis of the wheel, and a companion member carried by the other annular member and telescopically disposed about said last named means.

2. A hydraulic brake of the character described comprising a chamber having parallel side walls disposed at right angles to the axis of a vehicle wheel, a fluid-containing expandible chamber disposed within said first named chamber, and composed of said two relatively movable annular members, one of said members having a portion telescopically disposed within the other member, means for supplying fluid to the interior of the chamber, a stationary pin, means carried by one of said movable annular members and surrounding said pin for permitting movement of said annular member longitudinally with respect to said pin, while preventing rotative movement with respect to the axis of the wheel, a companion member carried by the other annular member and telescopically disposed about said last named means, and spring means disposed externally of said expandible chamber for normally drawing the movable portions thereof together.

FRANK CRIST SHEPLEY.